(12) United States Patent
Taylor et al.

(10) Patent No.: US 7,600,246 B2
(45) Date of Patent: Oct. 6, 2009

(54) METHOD AND APPARATUS FOR ANALYZING PROGRAM DATA

(75) Inventors: Thomas H. Taylor, Redmond, WA (US); Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 1591 days.

(21) Appl. No.: 10/126,256

(22) Filed: Apr. 17, 2002

(65) Prior Publication Data

US 2003/0198461 A1 Oct. 23, 2003

(51) Int. Cl.
  G06F 3/00 (2006.01)
  G06F 13/00 (2006.01)
  H04N 5/445 (2006.01)
  H04N 5/91 (2006.01)

(52) U.S. Cl. .................. 725/58; 725/61; 386/83
(58) Field of Classification Search ............ 725/58; 386/83
See application file for complete search history.

(56) References Cited

U.S. PATENT DOCUMENTS

| | | | |
|---|---|---|---|
| 5,479,268 A | 12/1995 | Young et al. | |
| 6,216,264 B1 | 4/2001 | Maze et al. | |
| 6,266,814 B1 | 7/2001 | Lemmons et al. | |
| 2002/0009285 A1 | 1/2002 | Safadi et al. | |
| 2003/0014753 A1* | 1/2003 | Beach et al. ............ | 725/53 |
| 2003/0085997 A1* | 5/2003 | Takagi et al. ............ | 348/143 |
| 2005/0204388 A1* | 9/2005 | Knudson et al. .......... | 725/58 |
| 2008/0184308 A1* | 7/2008 | Herrington et al. ....... | 725/43 |

FOREIGN PATENT DOCUMENTS

| | | |
|---|---|---|
| JP | 10021601 A | 1/1998 |
| JP | 2000295538 A | 10/2000 |
| JP | 2001024980 A | 1/2001 |
| JP | 2001197411 A | 7/2001 |
| JP | 2001257975 A | 9/2001 |
| JP | 2001326865 A | 11/2001 |
| JP | 2001333336 A | 11/2001 |
| JP | 2001333357 A | 11/2001 |
| JP | 2002057969 A | 2/2002 |
| WO | WO99/04561 | 1/1999 |
| WO | WO0147238 | 6/2001 |

OTHER PUBLICATIONS

U.S. Appl. No. 09/332,625.*
Dialog Database Record, INSPEC Abstract No. B2001-04-6420-009, Dec. 2000.
Danaher, Peter J. et al., "Optimizing Television Program Schedules Using Choice Modeling", Journal of Marketing Research, vol. XXXVIII, Aug. 2001, 15 pages.

(Continued)

Primary Examiner—Christopher Kelley
Assistant Examiner—Usha Raman
(74) Attorney, Agent, or Firm—Lee & Hayes, PLLC (57) ABSTRACT

A system identifies a television program selected to be recorded. The identified television program has a scheduled start time and is associated with a program series. A program guide is searched to locate television programs associated with the same series as the identified television program. The program guide is searched for television programs that have a start time within a predetermined period of time of the scheduled start time of the television program selected to be recorded.

6 Claims, 9 Drawing Sheets

OTHER PUBLICATIONS

Oliphant, Andrew et al., "TV gets personal", IEE Review, Sep. 2001, 5 pages.

McDonald, Kieran et al., "Online Television Library: Organisation and Content Browsing for General Users", Storage and Retrieval for Media Databases 2001, 9 pages.

Partial European Search Report dated Oct. 22, 2007, EP Application No. 03006199.8, 5 pages.

European Search Report dated Dec. 3, 2007 from counterpart EP patent application No. 03006199.8, 7 pages.

Official Notice of Rejection for Japanese Patent Application No. 2003-1122215, mailed on Dec. 5, 2008, 10 pages.

Official Notice of Final Rejection from the Japanese Patent Office for Application No. 2003-112215, mailed on Apr. 3, 2009, 15 pgs.

* cited by examiner

METHOD AND APPARATUS FOR ANALYZING PROGRAM DATA

TECHNICAL FIELD

This invention relates to the analysis of program data and, in particular, to systems and methods that analyze program data, such as television program data, to schedule recording events.

BACKGROUND

Client devices, such as digital video recorders (DVRs), may include a program guide or other mechanism that displays information to a viewer. The displayed information may be related to various television programs that are scheduled on different channels and different times on a particular day. A viewer is able to select one or more television programs to be recorded such that the viewer can watch the recorded programs at the viewer's convenience. Additionally, a viewer may enter a request to record all shows in a particular series (such as a sitcom or drama series) or shows that recur at a particular frequency (such as a program scheduled for 9:00 p.m. every Monday evening).

The program guide content may change as particular programs are cancelled, rescheduled, or preempted by other programs. Such changes increases the difficulty of locating and recording the correct programs from the program guide. Further, some programs may change start times and program length from one week to the next (or from one broadcast of the program to the next). These changes further complicate the task of identifying and recording the correct programs from the program guide.

Accordingly, there is a need for systems and methods that analyze program guide data to identify programs that should be recorded.

SUMMARY

The systems and methods described herein review data contained in a program guide or other information source to identify programs that should be recorded based on a viewer's recording requests. The systems and methods described herein can be used to record a series of programs (also referred to as periodic shows). Although a viewer requests to record a particular program, other programs in the same series are identified and automatically recorded in addition to the program requested by the viewer. The program guide is checked periodically for scheduling changes in any of the programs scheduled to be recorded.

In one embodiment, a television program selected to be recorded is identified. The television program has a scheduled start time and is associated with a program series. A program guide is searched to locate television programs associated with the same program series as the identified television program. The program guide is searched for television programs having a start time within a predetermined period of time of the scheduled start time of the television program selected to be recorded.

In a particular embodiment, a first television program selected to be recorded is identified. A first program identifier associated with the first television program is also identified. A second television program is identified in a program guide. A second program identifier associated with the second television program is also identified. The second television program is scheduled to be recorded if the first program identifier matches the second program identifier.

In another embodiment, a program scheduled to be recorded is identified. At least one attribute associated with the program scheduled to be recorded is also identified. If the attribute identifies the program as a live sports program, the recording of the program is extended by a predetermined time period.

BRIEF DESCRIPTION OF THE DRAWINGS

The same numbers are used throughout the drawings to reference like features and components.

DETAILED DESCRIPTION

The following discussion provides specific examples directed to television-based entertainment systems, such as interactive TV networks, cable networks that utilize electronic program guides, and Web-enabled TV networks. Clients in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and methods can be used in any of these systems and for any types of clients, they are described in the context of the following exemplary environment.

Figure 1:
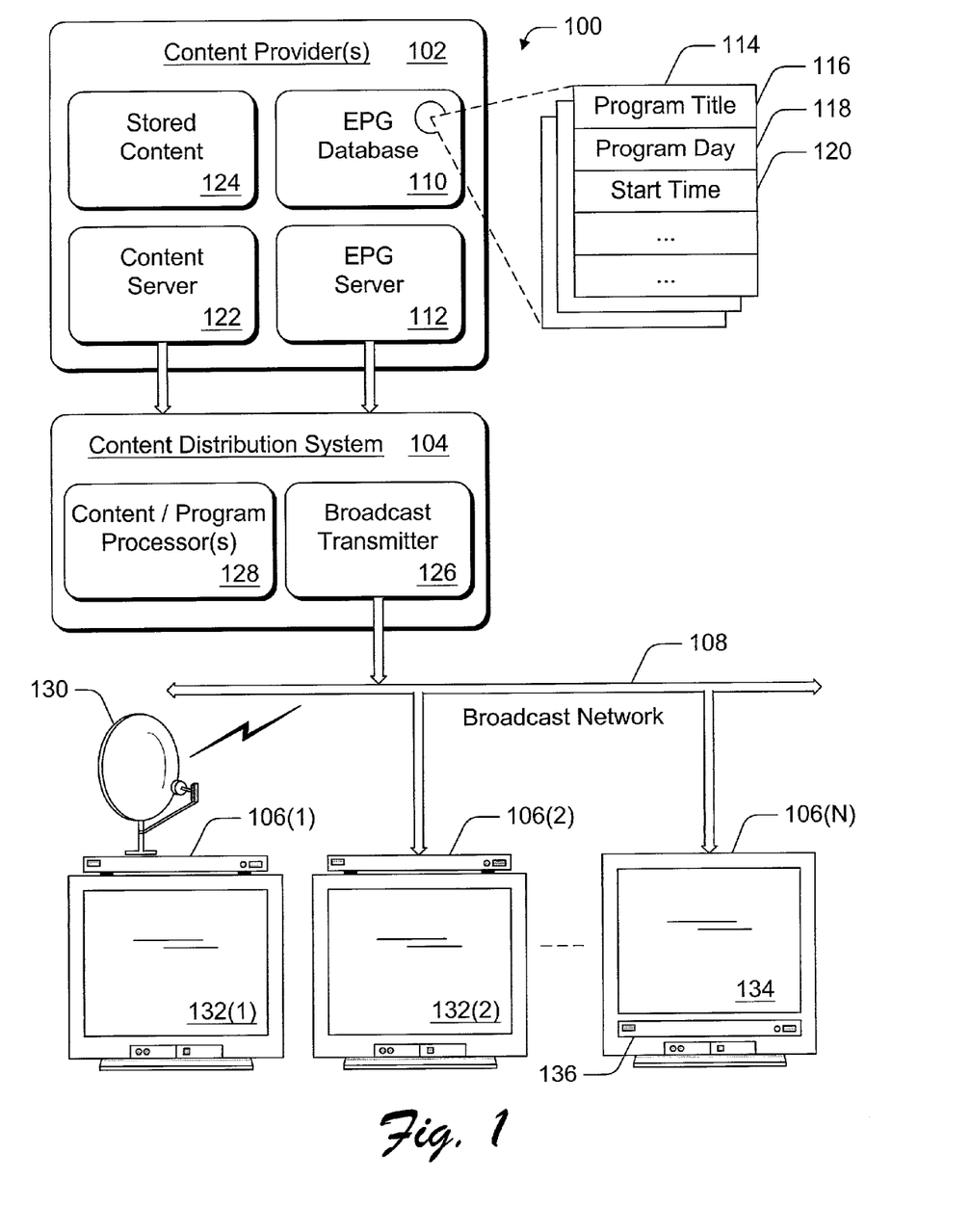
FIG. 1 illustrates an exemplary environment in which the systems and methods described herein may be implemented.

FIG. 1 illustrates an exemplary environment 100 in which the methods and systems described herein may be implemented. Exemplary environment 100 is a television entertainment system that facilitates distribution of content and program data to multiple viewers. The environment 100 includes one or more content providers 102, a content distribution system 104, and multiple client devices 106(1), 106(2), . . . , 106(N) coupled to the content distribution system 104 via a broadcast network 108.

Content provider 102 includes an electronic program guide (EPG) database 110 and an EPG server 112. The EPG database 110 stores electronic files of program data 114 that is used to generate an electronic program guide (or, "program guide"). Program data includes program titles, ratings, characters, descriptions, actor names, station identifiers, channel identifiers, schedule information, and the like. The terms "program data" and "EPG data" are used interchangeably throughout this discussion. For discussion purposes, an electronic file maintains program data 114 that includes a program title 116, a program day or days 118 to identify which days of the week the program will be shown, and a start time or times 120 to identify the time that the program will be shown on the particular day or days of the week. In a particular embodiment, the electronic file does not contain specific information indicating which days of the week a program is broadcast. This information is inferred from the EPG.

The EPG server 112 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The EPG server 112 controls distribution of the published version of the program data from content provider 102 to the content distribution system 104 using, for example, a file transfer protocol (FTP) over a TCP/IP network (e.g., Internet, UNIX, etc.).

Content provider 102 also includes a content server 122 and stored content 124, such as movies, television programs, commercials, music, and similar audio and/or video content. Content server 122 controls distribution of the stored content 124 and EPG data from content provider 102 to the content distribution system 104. Additionally, content server 102 controls distribution of live content (e.g., content that was not previously stored, such as live feeds) and/or content stored at other locations to the content distribution system 104.

Content distribution system 104 contains a broadcast transmitter 126 and one or more content and program data processors 128. Broadcast transmitter 126 broadcasts signals, such as cable television signals, across broadcast network 108. Broadcast network 108 can include a cable television network, RF, microwave, satellite, and/or data network, such as the Internet, and may also include wired or wireless media using any broadcast format or broadcast protocol. Additionally, broadcast network 108 can be any type of network, using any type of network topology and any network communication protocol, and can be represented or otherwise implemented as a combination of two or more networks.

Content and program data processor 128 processes the content and program data received from content provider 102 prior to transmitting the content and program data across broadcast network 108. A particular content processor may encode, or otherwise process, the received content into a format that is understood by the multiple client devices 106(1), 106(2), . . . , 106(N) coupled to broadcast network 108. Although FIG. 1 shows a single content provider 102 and a single content distribution system 104, environment 100 can include any number of content providers coupled to any number of content distribution systems.

Content distribution system 104 is representative of a headend service that provides EPG data, as well as content, to multiple subscribers. Each content distribution system 104 may receive a slightly different version of the program data that takes into account different programming preferences and lineups. The EPG server 112 creates different versions of EPG data (e.g., different versions of a program guide) that include those channels of relevance to respective headend services. Content distribution system 104 transmits the EPG data to the multiple client devices 106(1), 106(2), . . . , 106(N). In one implementation, for example, distribution system 104 utilizes a carousel file system to repeatedly broadcast the EPG data over an out-of-band (OOB) channel to the client devices 106.

Client devices 106 can be implemented in a number of ways. For example, a client device 106(1) may receive broadcast content from a satellite-based transmitter via a satellite dish 130. Client device 106(1) is also referred to as a set-top box or a satellite receiving device. Client device 106(1) is coupled to a television 132(1) for presenting the content received by the client device (e.g., audio data and video data), as well as a graphical user interface. A particular client device 106 can be coupled to any number of televisions 132 and/or similar devices that can be implemented to display or otherwise render content. Similarly, any number of client devices 106 can be coupled to a television 132.

Client device 106(2) is coupled to receive broadcast content from broadcast network 108 and provide the received content to associated television 132(2). Client device 106(N) is an example of a combination television 134 and integrated set-top box 136. In this example, the various components and functionality of the set-top box are incorporated into the television, rather than using two separate devices. The set-top box incorporated into the television may receive broadcast signals via a satellite dish (similar to satellite dish 130) and/or via broadcast network 108. In alternate implementations, client devices 106 may receive broadcast signals via the Internet or any other broadcast medium.

Each client 106 runs an electronic program guide (EPG) application that utilizes the program data. An EPG application enables a TV viewer to navigate through an onscreen program guide and locate television shows of interest to the viewer. In a particular embodiment, the program guide is displayed on a device other than the television, such as a handheld device. With an EPG application, the TV viewer can look at schedules of current and future programming, set reminders for upcoming programs, and/or enter instructions to record one or more television shows.

Figure 2:
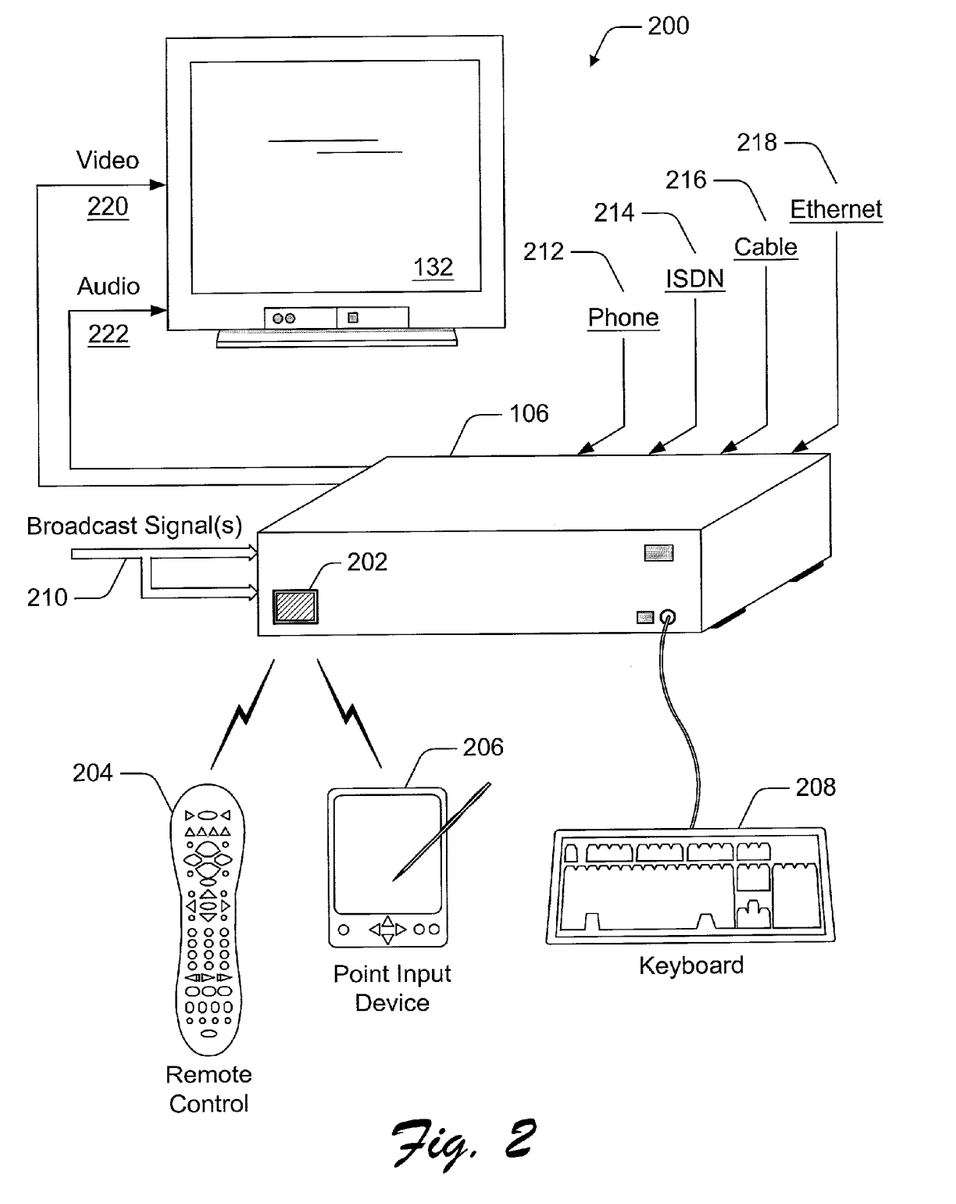
FIG. 2 illustrates of an example client device, a television, and various input devices that interact with the client device.

FIG. 2 illustrates an exemplary implementation 200 of a client device 106 shown as a standalone unit that connects to a television 132. Client device 106 can be implemented in any number of embodiments, including as a set-top box, a satellite receiver, a TV recorder with a hard disk, a game console, an information appliance, and so forth. Client device 106 includes a wireless receiving port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 is coupled to communicate with the client device 106. In alternate embodiments, remote control device 204, handheld device 206, and/or keyboard 208 may us an RF communication link or other mode of transmission to communicate with client device 106.

Client device 106 receives one or more broadcast signals 210 from one or more broadcast sources, such as from a satellite or from a broadcast network. Client device 106 includes hardware and/or software for receiving and decoding broadcast signal 210, such as an NTSC, PAL, SECAM or other TV system video signal. Client device 106 also includes hardware and/or software for providing the viewer with a graphical user interface by which the viewer can, for example, access various network services, configure the client device 106, and perform other functions.

Client device 106 is capable of communicating with other devices via one or more connections including a conventional telephone link 212, an ISDN link 214, a cable link 216, and an Ethernet link 218. Client device 106 may use any one or more of the various communication links 212-218 at a particular instant to communicate with any number of other devices.

Client device 106 generates video signal(s) 220 and audio signal(s) 222, both of which are communicated to television 132. The video signals and audio signals can be communicated from client device 106 to television 132 via an RF (radio frequency) link, S-video link, composite video link, component video link, or other communication link. Although not shown in FIG. 2, client device 106 may include one or more lights or other indicators identifying the current status of the device. Additionally, the client device may include one or more control buttons, switches, or other selectable controls for controlling operation of the device.

Figure 3:
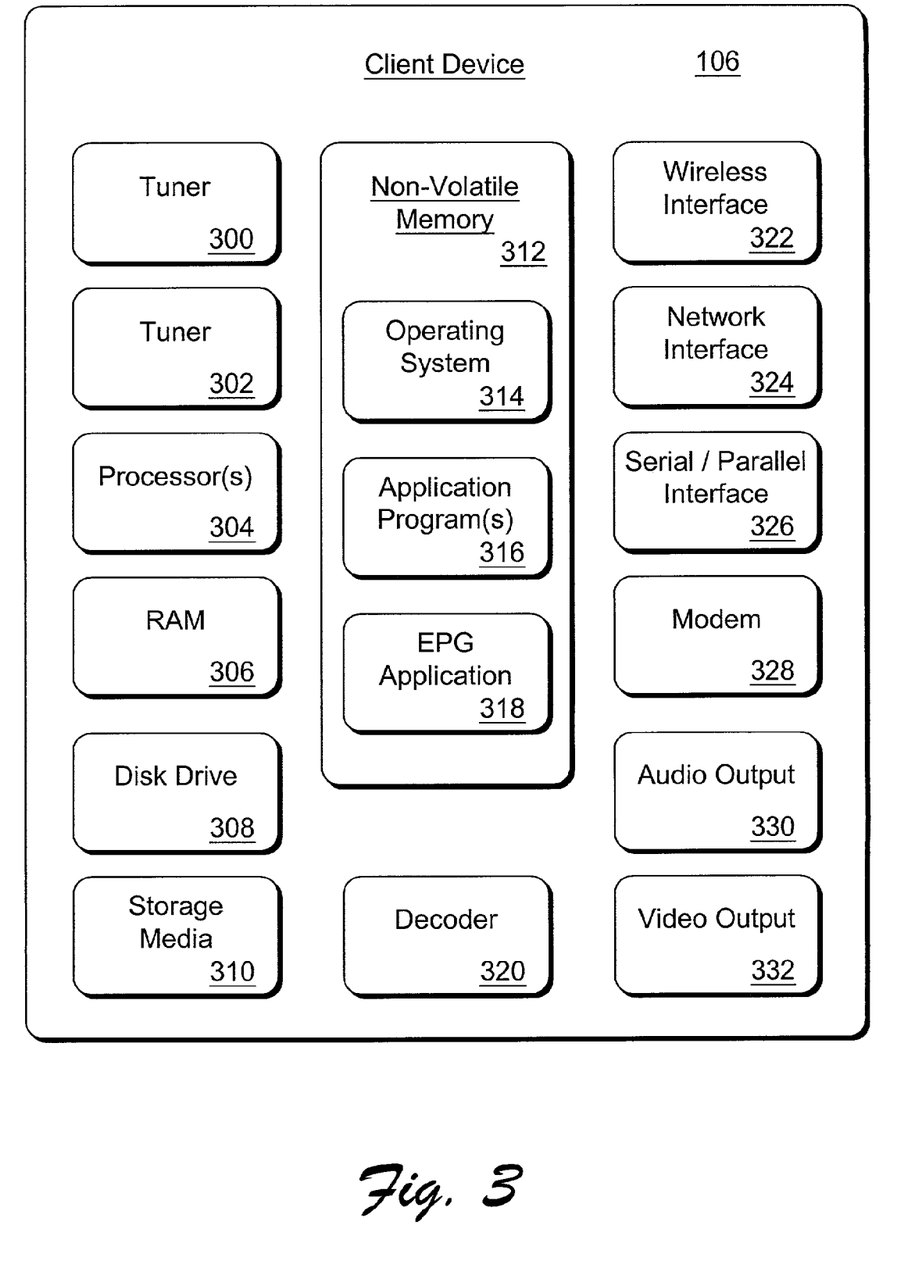
FIG. 3 is a block diagram that illustrates components of the example client device(s) shown in FIGS. 1 and 2.

FIG. 3 illustrates selected components of client device 106 shown in FIGS. 1 and 2. Client device 106 includes a first tuner 300 and an optional second tuner 302. The tuners 300 and 302 are representative of one or more in-band tuners that tune to various frequencies or channels to receive television signals, as well as an out-of-band tuner that tunes to the broadcast channel over which the EPG data is broadcast to client device 106.

Client device 106 also includes one or more processors 304 and one or more memory components. Examples of possible memory components include a random access memory (RAM) 306, a disk drive 308, a mass storage component 310, and a non-volatile memory 312 (e.g., ROM, Flash, EPROM, EEPROM, etc.). Alternative implementations of client device 106 can include a range of processing and memory capabilities, and may include more or fewer types of memory components than those illustrated in FIG. 3. For example, full-resource clients can be implemented with substantial memory and processing resources, including the disk drive 308 to store content for replay by the viewer. Low-resource clients, however, may have limited processing and memory capabilities, such as a limited amount of RAM 306, no disk drive 308, and limited processing capabilities.

Processor(s) 304 process various instructions to control the operation of client device 106 and to communicate with other electronic and computing devices. The memory components (e.g., RAM 306, disk drive 308, storage media 310, and non-volatile memory 312) store various information and/or data such as content, EPG data, configuration information for client device 106, and/or graphical user interface information.

An operating system 314 and one or more application programs 316 may be stored in non-volatile memory 312 and executed on processor 304 to provide a runtime environment. A runtime environment facilitates extensibility of client device 106 by allowing various interfaces to be defined that, in turn, allow application programs 316 to interact with client device 106. In the illustrated example, an EPG application 318 is stored in memory 312 to operate on the EPG data and generate a program guide. The application programs 316 that may be implemented at client device 106 can include a browser to browse the Web, an email program to facilitate electronic mail, and so on. Client device 106 can also include other components pertaining to a television entertainment system which are not illustrated in this example for simplicity purposes. For instance, client device 106 can include a user interface application and user interface lights, buttons, controls, etc. to facilitate viewer interaction with the device.

Client device 106 also includes a decoder 320 to decode a broadcast video signal, such as an NTSC, PAL, SECAM or other TV system video signal. Client device 106 further includes a wireless interface 322, a network interface 324, a serial and/or parallel interface 326, and a modem 328. Wireless interface 322 allows client device 106 to receive input commands and other information from a user-operated input device, such as from a remote control device or from another IR, Bluetooth, or similar RF input device.

Network interface 324 and serial and/or parallel interface 326 allows client device 106 to interact and communicate with other electronic and computing devices via various communication links. Although not shown, client device 106 may also include other types of data communication interfaces to communicate with other devices. Modem 328 facilitates client device 106 communication with other electronic and computing devices via a conventional telephone line.

Client device 106 also includes an audio output 330 and a video output 332 that provide signals to a television or other device that processes and/or presents or otherwise renders the audio and video data. Although shown separately, some of the components of client device 106 may be implemented in an application specific integrated circuit (ASIC). Additionally, a system bus (not shown) typically connects the various components within client device 106. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is made herein to one or more client devices, such as client device 106. As used herein, "client device" means any electronic device having data communications, data storage capabilities, and/or functions to process signals, such as broadcast signals, received from any of a number of different sources.

Although the example discussed below relates to a television program guide, the methods and systems described herein may be applied to any system or environment in which information is displayed to a viewer. Alternate embodiments discussed later in this description point out other exemplary applications of the methods and systems described herein.

Figure 4:
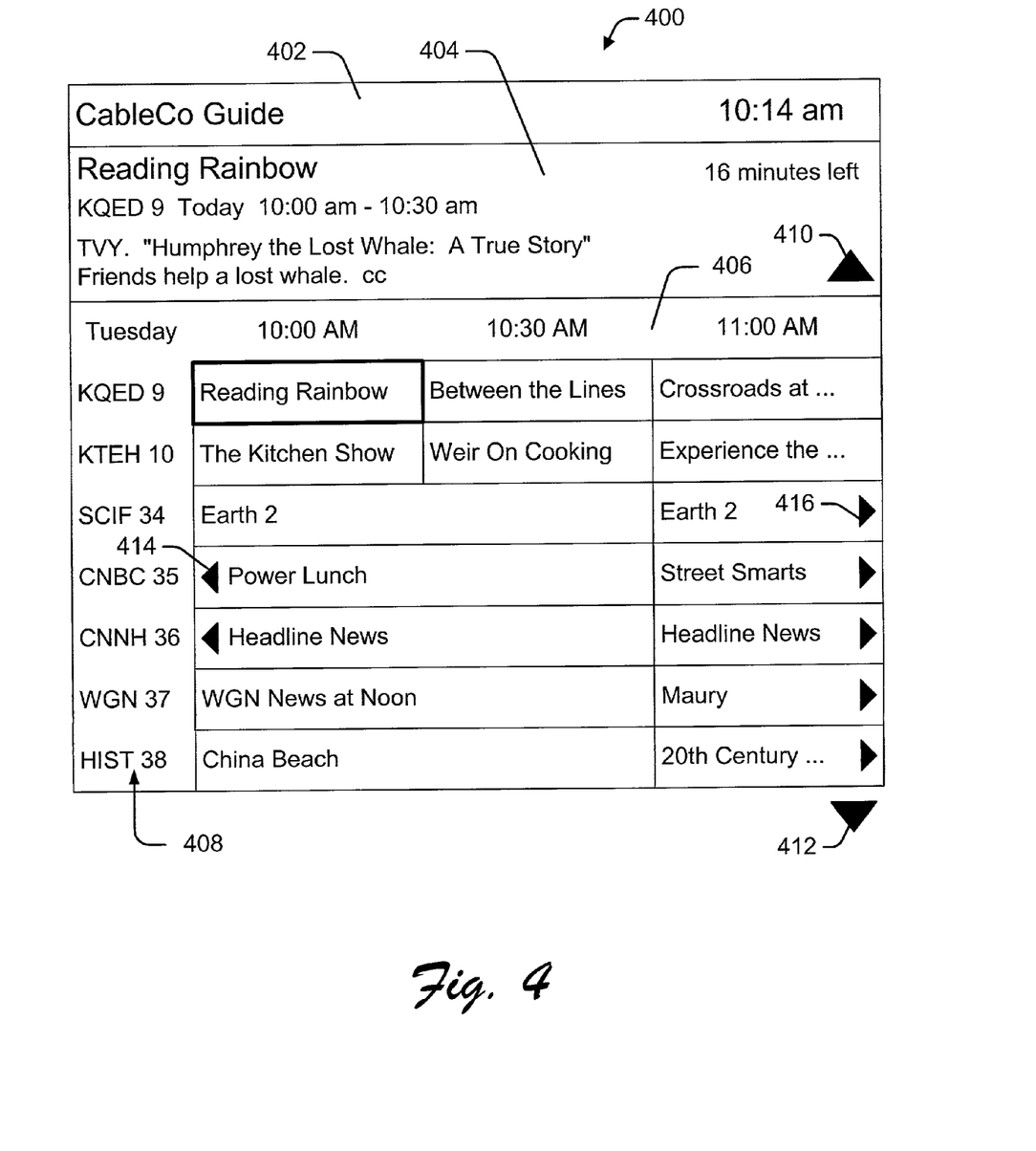
FIG. 4 illustrates an example program guide that shows a portion of a channel programming lineup for a particular Tuesday.

FIG. 4 illustrates an example program guide 400 that shows a portion of a channel programming lineup for a particular Tuesday. Program guide 400 is generated, for example, with electronic program guide (EPG) application 318 in client device 106 using program data 114, and displayed on television 132 (FIGS. 1-2). The program guide 400 provides a viewer with a program title, program description, the associated local channel number and/or Network that will broadcast the program, and a time of the day that the program will be broadcast. For example, an episode of the television program "Reading Rainbow" is scheduled for broadcast on local channel nine (KQED) at 10:00 a.m. on the current day (Tuesday).

Program guide 400 includes a header 402 and a program description region 404. Header 402 displays, for example, the name of the local cable company (or content distributor) and the current time. Program description region 404 displays information about the currently selected program (Reading Rainbow in this example). The program description region 404 also displays the time left in a currently running program (e.g., "16 minutes left") or the time until the program begins (e.g., "starts in 25 minutes"). Program guide 400 also includes a "time row" 406, which identifies the current day and one or more time periods currently being displayed. In the example program guide, the time period 10:00 a.m.-11:30 a.m. is displayed. In this example, the time row 406 of program guide 400 includes three "time columns": a first time column from 10:00 a.m.-10:30 a.m., a second time column from 10:30 a.m.-11:00 a.m., and a third time column from 11:00 a.m.-11:30 a.m. In alternate embodiments, the time row 406 may represent any time duration and may include any number of time columns. A particular program may span any number of time columns.

As shown in FIG. 4, a single program, Reading Rainbow, is highlighted as the currently selected program. In this example, the currently selected program is identified by a thicker border. Alternatively, the currently selected program can be identified by changing the color of the text and/or background associated with a particular program, or any other modification to the display that distinguishes one program from the others. The currently selected program may, by default, be located in the upper left corner of the program grid (as shown in FIG. 4), or may be located elsewhere in the program grid. The program grid is a two-dimensional grid of program listings defined horizontally by the currently selected time columns and defined vertically by the currently displayed channels. The programs displayed in the program grid change as the viewer enters commands to scroll up, scroll down, scroll left or scroll right.

A viewer can change the currently selected program within program guide 400 by manipulating, for example, remote control 204 to input a control command to client device 106. As shown, the currently selected program, Reading Rainbow, is scheduled for broadcast by KQED (local channel 9) from 10:00 a.m.-10:30 a.m. Using remote control 204, a viewer can enter a request to scroll to a different time entry and/or a different channel.

Program guide 400 also includes a listing of seven channels arranged in a column 408. This listing of seven channels is arranged, for example, in ascending numerical order from top to bottom. In alternate embodiments, the listing of channels may be arranged in any order, such as a descending numerical order or an arrangement that places "favorite channels" at the top of the listing. A viewer can change the channel associated with the currently selected program by entering a control command to scroll up or down through the list of available channels. An upward pointing arrow 410 indicates that additional channels are available earlier in the channel list by scrolling up. A downward pointing arrow 412 indicates that additional channels are available further down the channel list by scrolling down. The left-pointing arrows 414 indicate that the particular program started in an earlier time period not currently shown in the program grid. For example, the program "Power Lunch" may begin at 9:00 a.m. Similarly, the right-pointing arrows 416 indicate that the particular program ends in a later time period not currently shown in the program grid. For example, the program "Street Smarts" may continue until 12:00 p.m.

A viewer can scroll through the program guide to identify one or more programs that they want to record. The viewer may request to record a single episode of the program or may request to record a series of episodes (e.g., multiple episodes that are broadcast at periodic intervals, such as every Monday at 8:00 p.m.).

Program guide 400 shown in FIG. 4 represents one embodiment of a program guide. The teachings of the present invention may be applied to environments using other types of program guides including more or less information and program guides that arrange information in a different manner.

Figure 5:
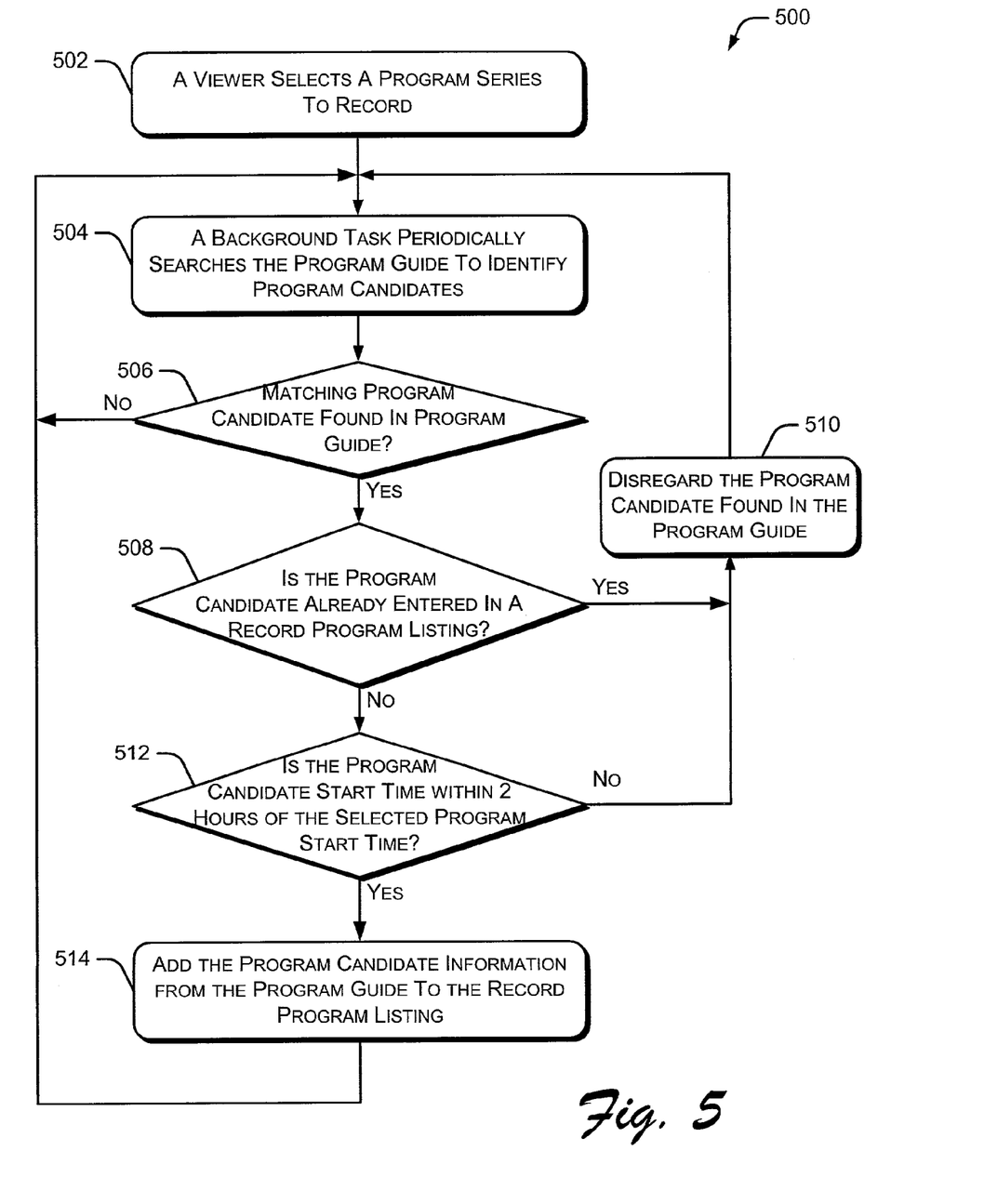
FIG. 5 illustrates a flow diagram of a procedure for determining whether to record a particular program.

FIG. 5 illustrates a flow diagram of a procedure 500 for determining whether to record programs identified in a program guide. Initially, a viewer selects a program series to record (block 502), using, for example, a program guide of the type shown in FIG. 4. In this example, the user is selecting all programs in the series rather than a particular episode of the series. A background task periodically searches the program guide to identify program candidates (block 504). Program candidates are programs listed in the program guide that initially appear to be in the same program series selected by the viewer in block 502. For example, if a viewer selects tomorrow's episode of a particular program, the background task may run every two hours searching the program guide for program candidates. The background task searches for the same program series on each day of the week, thereby identifying shows that are broadcast daily, weekly, or at irregular intervals.

Block 506 of FIG. 5 determines whether the background task identified a program candidate in the program guide. If not, the procedure returns to block 504 to await the next execution of the background task. In a particular embodiment, the background task is executed every two hours. In alternate embodiments, the background task may be executed at any interval, and may be executed at different intervals depending on the time of day, system resources available to execute the task, or other factors. The frequency of program guide changes also determines the frequency at which the background task is executed. If the program guide is updated twice daily, the typical background task will be executed once or twice a day.

Figure 6:
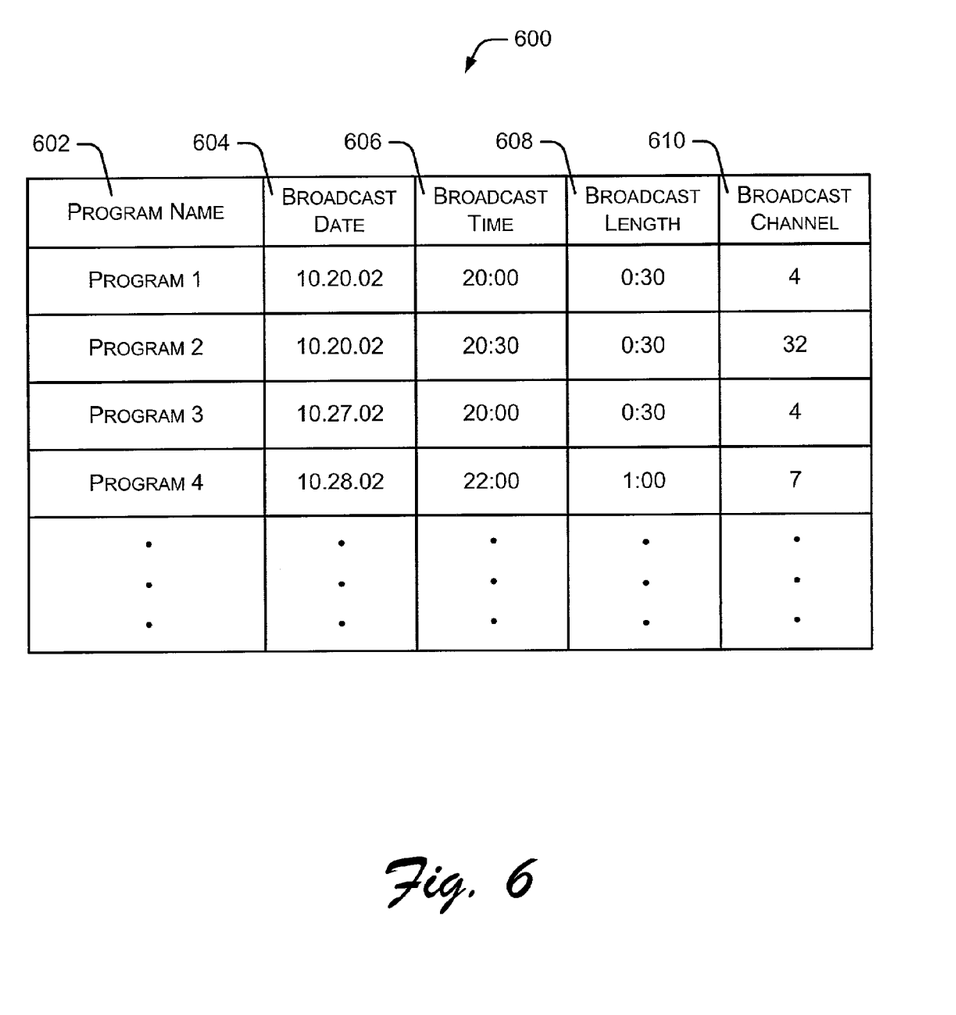
FIG. 6 illustrates a listing of programs to be recorded by a recording device.

If a program candidate was found in the program guide at block 506, the procedure determines whether the program candidate is already entered in a record program listing (block 508). The record program listing, discussed below with respect to FIG. 6, is a listing of programs that are scheduled to be recorded by one or more recording devices. If the program candidate is already entered in the record program listing, the procedure branches to block 510, which disregards the program candidate found in the program guide and returns to block 504 to await the next execution of the background task.

If the program candidate is not entered in the record program listing, the procedure determines whether the program candidate start time is within two hours of the start time of the program selected by the viewer (block 512). This four hour recording window (two hours before the start time to two hours after the start time) limits the shows that are recorded to approximately the same time-of-day as the program selected by the viewer. Thus, if the user selects a program in prime time (e.g., 8:00 p.m.), the procedure 500 will reject the same program title that is broadcast during daytime hours (e.g., between 9:00 a.m. and 5:00 p.m.). The four hour recording window also allows for a small (up to two hours) change in the start time of the program and identifies the occurrence of back-to-back programs. Although a four hour recording window is illustrated, the recording window can be any size (i.e., larger than or smaller than four hours).

If the program candidate start time is not within two hours of the selected program start time, the program candidate is disregarded at block 510. If the program candidate start time is within two hours of the selected program start time, the program candidate is added to the record program listing (block 514). Specifically, program candidate information from the program guide is added to the record program listing.

The background task discussed above considers each program in the four hour recording window and compares the program candidate found in the program guide with the attributes of the original program selected by the viewer for recording. If the two programs are part of the same series, then the program candidate identified in the program guide is added to the record program listing as a program to be recorded.

As mentioned above, the background task may run every two hours searching the program guide for matching shows.

In a particular embodiment, the task searches the program guide for an additional day during each successive execution of the task. The task searches the program guide from the current time to a particular time a specified number of days into the future. Thus, a program scheduled for tomorrow will be searched twelve times a day (i.e., every time the task is executed) and a program scheduled twelve days in the future will be searched once in the 24 hour period. Thus, processing resources are focused on programs that are scheduled within the next few days and fewer processing resources are used on programs that are farther away in the program guide. The following Table illustrates the search criteria for the background task at two hour intervals.

TABLE 1

| Task Execution Time | Search Range |
|---|---|
| 2:00 | Search Entire Guide |
| 4:00 | 2 days out |
| 6:00 | 3 days out |
| 8:00 | 4 days out |
| 10:00 | 5 days out |
| 12:00 | 6 days out |
| 14:00 | 7 days out |
| 16:00 | 8 days out |
| 18:00 | 9 days out |
| 20:00 | 10 days out |
| 22:00 | 11 days out |
| 24:00 | 12 days out |

As shown in Table 1, the first task execution each day searches the entire program guide. The next execution of the task searches the program guide two days into the future. Each successive execution of the task searches the program guide an additional day into the future. Alternate embodiments may execute the task at any time interval and may search the program guide at any period into the future.

FIG. 6 illustrates a listing 600 of candidate programs to be recorded by one or more recording devices. The programs are still referred to as "candidate programs" because a particular program may be removed from listing 600 if the program is cancelled, preempted by another program, or otherwise modified such that the program no longer appears to be part of the same series as the original program selected by the viewer for recording.

Listing 600 includes a program name 602 associated with each program in the listing, a broadcast date 604, a broadcast start time 606, a broadcast length 608, and a broadcast channel 610 for each of the programs in the listing. The broadcast date 604 and the broadcast start time 606 are used by a recording device to determine when to begin recording the particular program. The broadcast length 608 lets the recording device know how long it must record to capture the program and the broadcast channel 610 identifies the channel that must be tuned by the recording device to receive the desired program. The data contained in listing 600 may be updated as information about one or more programs in the listing is modified (e.g., based on information retrieved from a program guide).

Figure 7:
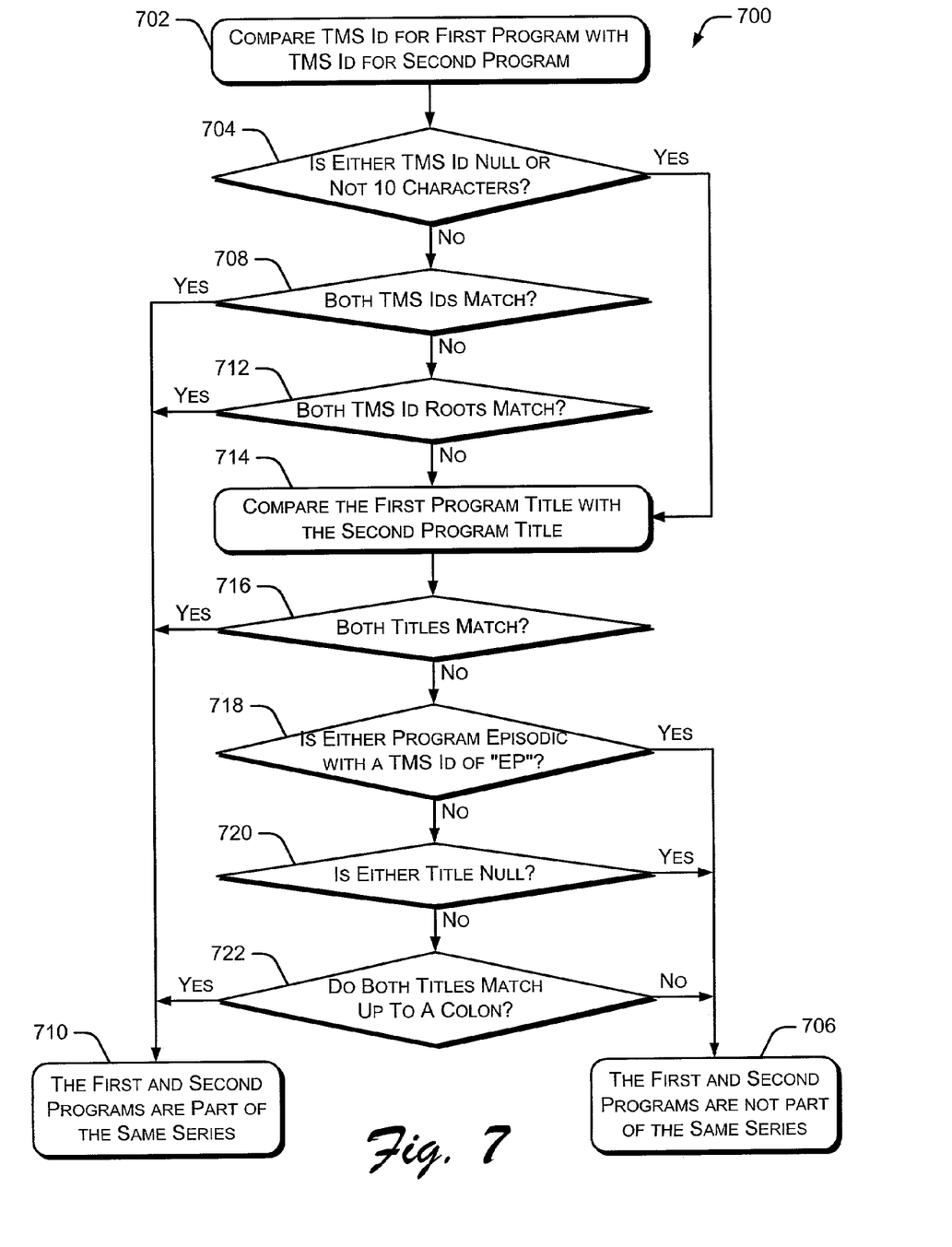
FIG. 7 illustrates a flow diagram of a procedure for determining whether a first program is the same as a second program.

FIG. 7 illustrates a flow diagram of a procedure 700 for determining whether a first program and a second program are part of the same series (i.e., whether a program in the program guide is part of the same series as the program selected by the viewer for recording). Initially, the procedure 700 compares a Tribune Media Systems (TMS) Id associated with a first program with a TMS Id associated with a second program (block 702). A TMS Id is a unique identifier assigned to movies, sporting events, series and other programs. The TMS Ids are twelve characters in length. The first two characters identify the type of program: SP for sporting events, SH for generic shows, EP for an episodic show (such as a series), or MV for a movie. The next six characters are numeric characters that identify the program series. The following four characters are also numeric characters and identify the episode within the series. An example TMS Id is "EP1234564444". Although the particular example of FIG. 7 utilizes the TMS Id system, alternate embodiments may utilize alternate identification systems or may not utilize any such identification system.

Procedure 700 continues by determining whether the TMS Id for either program is null or not ten characters in length (block 704). If so, the procedure branches to block 714, discussed below. Otherwise, the procedure continues to block 708, which determines whether both TMS Ids match. If both TMS Ids match, the first and second programs are considered to be part of the same series (block 710). If the programs are part of the same series, then the second program is added to the record program listing as a candidate to be recorded. If the two TMS Ids do not match, the procedure determines whether both TMS Id roots match (block 712). The TMS Id root is identified as the first six numeric characters of the ten numeric characters that identify the show. If the two TMS Id roots match, then the programs are considered to be part of the same series (block 710).

If the TMS Id roots do not match, the procedure 700 compares the first program title with the second program title (block 714). If both titles match, the programs are considered to be part of the same series and the procedure branches to block 710. Otherwise, the procedure determines whether either program is episodic (e.g., a series) with a TMS Id of "EP" (block 718). If either show is episodic and its TMS Id is "EP", the shows are not considered to be part of the same series (block 706). Block 720 determines whether either program title is null. If so, the programs are not part of the same series. Finally, block 722 determines whether both program titles match up to a colon (:) in the title. If so, the programs are considered to be part of the same series. If the titles do not match up to a colon in the title, the programs are not considered to be part of the same series. For example, the programs "Sports Century: Michael Jordan" and "Sports Century: Bill Walton" are considered to be part of the same series because they are different episodes of the same television series (Sports Century).

Between the time programs are scheduled to be recorded and the time the programs are scheduled to be broadcast, changes regarding the broadcast of the programs may occur. For example, the date and/or time of a particular program may change due to a programming change or other factors. Additionally, the same program may have already been recorded by the time a later program recording entry is executed. In this case, it is not necessary to re-record the same program unless there was a problem with the previous attempt to record the program.

Figure 8:
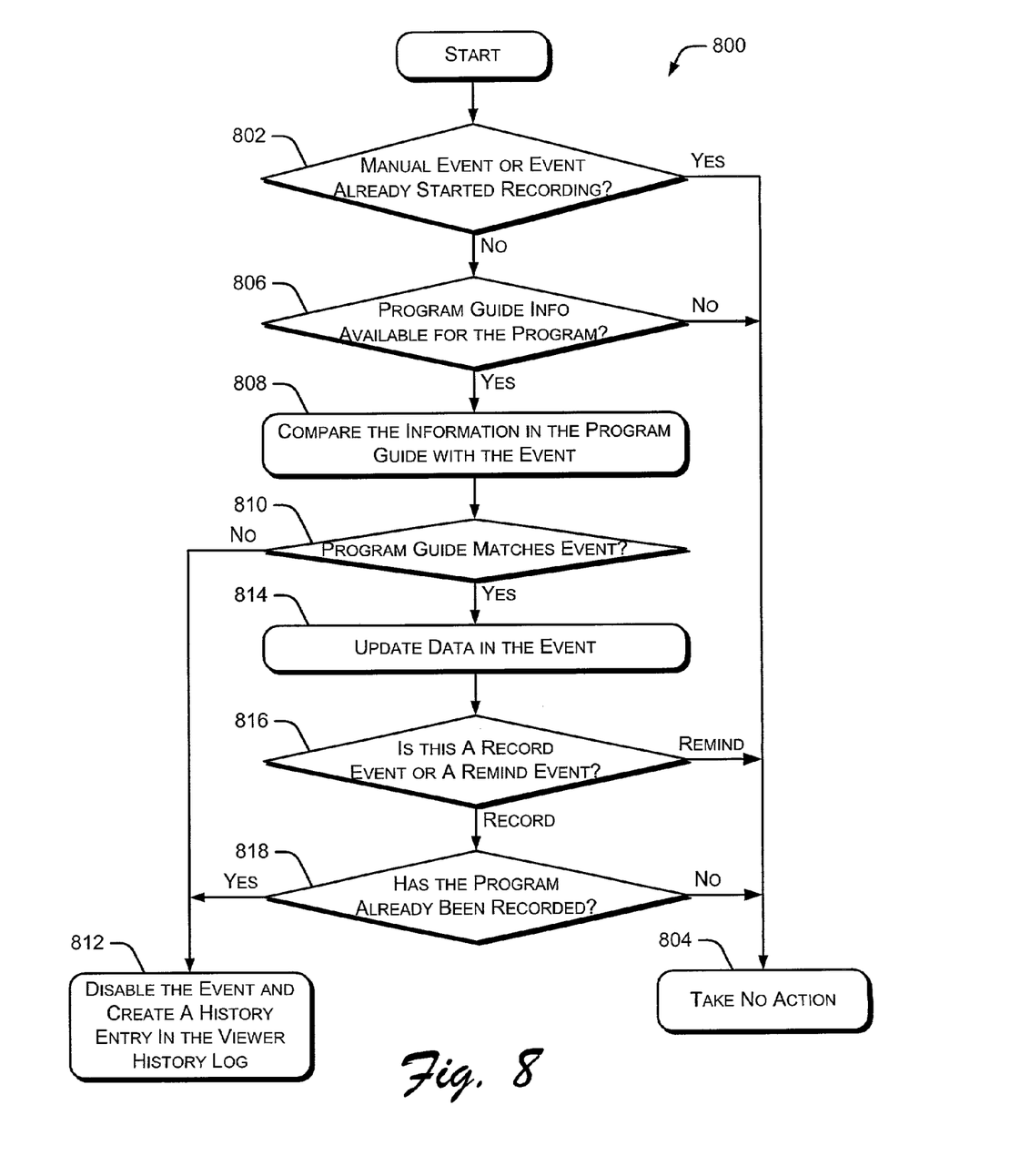
FIG. 8 illustrates a flow diagram of a procedure for determining whether information regarding a program scheduled to be recorded should be modified.

Each entry in the record program listing is periodically checked to be sure that the program information remains valid and that the program has not already been recorded. FIG. 8 illustrates a flow diagram of a procedure 800 for determining whether information regarding a program scheduled to be recorded should be modified. Initially, procedure 800 determines whether the event (e.g., the program to be recorded) is a manual event or whether the event has already started recording (block 802). A manual event is an event set up by a viewer to record a specific channel, at a specific time, for a specified length of time. In this situation, the program guide is not used to determine the program start time, length, etc. If the event is a manual event or recording has already started, the procedure branches to block 804, where no action is taken (i.e., the event is not modified).

If the event is not a manual event and recording has not yet started, the procedure determines whether program guide information is available for the program (block 806). If not no action is taken. If program guide information is available for the program, the information in the program guide is compared to the information associated with the event (block 808). If the program guide information no longer matches the information associated with the event (i.e., the program listed in the program guide is not the same as the program described by the event), the procedure branches to block 812, where the event is disabled and a history entry is created in a viewer history log. The viewer history log identifies programs that, for example, were rescheduled, cancelled, or pre-empted by another program.

If the program guide information matches the event at block 810, various data in the event is updated to match the information contained in the program guide (block 814). The updated data may include, for example, a program id, a program root id, a channel id, episodic and generic flags, episode title, and TMS Id. The updated data may also change the length of the program. In this situation, the data in the event is changed so that the program is recorded correctly. The procedure then determines whether the event is a record event or a remind event (block 816). A remind event does not typically initiate the recording of a program. Instead, a remind event generates a reminder message for a viewer (e.g., a message that a particular program is about to begin on a particular channel). If the event is a remind event, no action is taken.

If the event is a record event, the procedure determines whether the program has already been recorded (block 818). If the program has already been recorded, the procedure disables the event and creates a history entry in the viewer history log (block 812). If the program has not already been recorded, then the scheduled event remains unchanged (i.e., the program still needs to be recorded).

When determining whether the program has already been recorded, the procedure checks to see if a partial or incomplete recording of the program exists. If so, the program is re-recorded. If the length of the previously recorded program differs from the program to be recorded by more than 35 minutes, record the program. If the previously recorded program or the program to be recorded has the "generic" flag set, record the program. If the previously recorded program or the program to be recorded is missing a TMS Id, record the program. If the previously recorded program and the program to be recorded have the same TMS Ids, do not record the program. Additionally, if the program titles and the program episode titles match, the program is not recorded.

The procedure 800 illustrated in FIG. 8 is executed periodically to be sure that the program scheduled to be recorded is still in the program guide (i.e., has not been pre-empted by another program) and that the program has not already been recorded. As the start time of an event approaches, the procedure 800 is executed more frequently. This increases the likelihood that events that are closer to being recorded accurately reflect the current state of the program (as defined in the program guide). Events that are farther away in time are updated, but not as frequently. For example, when an event is more than three days away, execute the procedure once a day. When the event is less than three days away, execute the procedure every twelve hours. When the event is less than 24 hours away, execute the procedure every two hours. When the event is less than two hours away, execute the procedure every 30 minutes. When the event is less than 30 minutes away, execute the procedure every five minutes. And, when the event is less than five minutes away, execute the procedure once every minute. Alternate embodiments may execute the procedure at different intervals.

Many sporting events run past the time allotted to the event in the program guide. In this situation, if the recording of the event is not extended, the end of the event (which is potentially the most important part) is not recorded. Thus, live sporting events are automatically extended by 30 minutes to reduce the chances of not recording the entire event.

Figure 9:
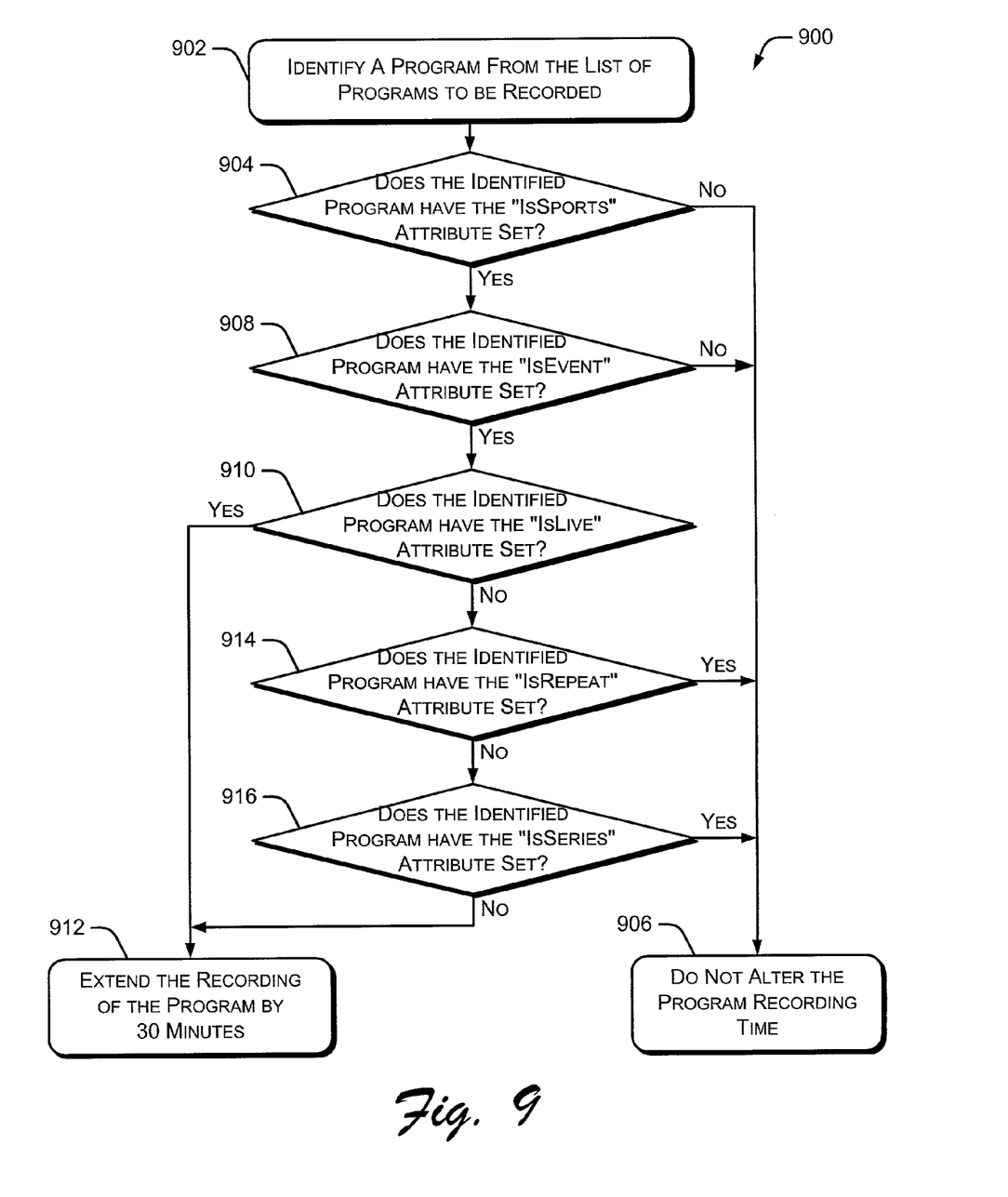
FIG. 9 illustrates a flow diagram of a procedure for determining whether a particular program is a live sporting event.

FIG. 9 illustrates a flow diagram of a procedure 900 for determining whether a particular program is a live sporting event. Initially, a program is identified from the list of programs to be recorded (block 902). The procedure then determines whether the identified program has the "IsSports" attribute set (block 904). The "IsSports" attribute identifies sporting events (both live and pre-recorded). This attribute is provided by the content provider and is incorporated into the program guide before the program guide is broadcast. If the program does not have the "IsSports" attribute set, the program is not a live sporting event, and the procedure branches to block 906, which does not alter the program recording time.

If the program has the "IsSports" attribute set, the procedure continues by determining whether the identified program has the "IsEvent" attribute set (block 908). The "IsEvent" attribute identifies events such as a concert, award show, sporting event, etc. If the program does not have the "IsEvent" attribute set, the program is not an event, and the procedure branches to block 906 without altering the program recording time.

If the program has the "IsEvent" attribute set, the procedure continues by determining whether the identified program has the "IsLive" attribute set. The "IsLive" attribute identifies live programs. If the program has the "IsLive" attribute set, the program is identified as a live sporting event and the recording of the program is extended by 30 minutes at block 912. The 30 minute extension represents one example of extending the program recording time. Alternatively, the program recording time may be extended by any time period. In one embodiment, different types of programs are extended by different time periods. For example, baseball programs may be extended by 30 minutes, football programs extended by 45 minutes, and golf programs extended by one hour.

If the program does not have the "IsLive" attribute set, the procedure determines whether the identified program has the "IsRepeat" attribute set. The "IsRepeat" attribute is associated with programs that are being re-broadcast (i.e., not the first broadcast of the program). If the identified program has the "IsRepeat" attribute set, the program is not a live sporting event, and the procedure branches to block 906.

If the "IsRepeat" attribute is not set, the procedure continues to block 916, which determines whether the identified program has the "IsSeries" attribute set. The "IsSeries" attribute is associated with programs that are part of a series. If the identified program has the "IsSeries" attribute set, the program is not a live sporting event, and the procedure branches to block 906. Otherwise, the program is considered to be a live sporting event and the recording of the program is extended by 30 minutes.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method implemented on a computing device by a processor configured to execute instructions that, when executed by the processor, direct the computing device to perform acts comprising:
   identifying, by the processor of the computing device, a first television program selected to be recorded, wherein the first television program has an associated title and a first associated unique identifier;
   identifying a first program title associated with the first television program, wherein the first program title includes only characters of the first television program title up to a colon;
   identifying a second television program in a program guide, wherein the second television program has an associated title and a second associated unique identifier;
   identifying a second program title associated with the second television program, wherein the second program title includes only characters of the second television program title up to a colon;
   when the first associated unique identifier is different from the second associated unique identifier, comparing a root of the first associated unique identifier with a root of the second associated unique identifier, and when the root of the first associated unique identifier is different from the root of the second associated unique identifier, comparing the first program title with the second program title, and
   scheduling the second television program to be recorded if the first program title matches the second program title based on the comparing.

2. A method as recited in claim 1 further comprising disregarding the second television program if the first program title does not match the second program title.

3. One or more computer-readable media comprising computer-executable instructions that, when executed, direct a computing system to perform the method of claim 1.

4. A computer system comprising:
   a memory;
   a processor coupled to the memory; and
   an application program stored in the memory and executed by the processor, the application program configured to:
      compare a first program identifier associated with a first television program selected by a user to a second program identifier associated with a second television program listed in a program guide, the first program identifier being a unique identifier assigned to the first program and the second program identifier being a unique identifier assigned to the second program, wherein the comparing is performed by a background task running on the computer system;
      identify the second television program as part of a same series or part of a different series based on the comparing of the first program identifier and the second program identifier, wherein:
         when the first program identifier and the second program identifier match, identify the second television program as part of the same series;
         when the first program identifier or the second program identifier is null or incomplete, compare a first program title associated with the first television program to a second program title associated with the second television program;
         when the first program title and the second program title match, identify the second television program as part of the same series; and
         when the first program title and the second program title do not match, identify the second television program as part of the different series; and
      schedule the second television program to be recorded if the second television program is identified as a part of the same series.

5. A computer system as recited in claim 4 wherein the first and second program identifiers are Tribune Media Systems Ids.

6. A computer system as recited in claim 4 wherein when the second television program is otherwise identified as a part of a different series, the application program is further configured to schedule the second television program to be recorded if a title associated with the first television program matches a title associated with the second television program.

* * * * *